United States Patent
Kim et al.

(10) Patent No.: US 9,878,405 B2
(45) Date of Patent: Jan. 30, 2018

(54) HEAT PROTECTOR AND MANUFACTURING AND MOUNTING METHODS

(71) Applicant: Hyundai Motor Company, Seoul (KR)

(72) Inventors: Tae-Wan Kim, Suwon Gyeonggi-Do (KR); Kwang-Weon Ahn, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 927 days.

(21) Appl. No.: 14/142,867

(22) Filed: Dec. 29, 2013

(65) Prior Publication Data

US 2015/0060026 A1 Mar. 5, 2015

(30) Foreign Application Priority Data

Aug. 27, 2013 (KR) .................. 10-2013-0101472

(51) Int. Cl.
| | | |
|---|---|---|
| *B23P 15/26* | (2006.01) | |
| *B32B 15/14* | (2006.01) | |
| *B32B 5/26* | (2006.01) | |
| *B32B 15/20* | (2006.01) | |
| *C04B 20/10* | (2006.01) | |

(52) U.S. Cl.
CPC .............. *B23P 15/26* (2013.01); *B32B 5/26* (2013.01); *B32B 15/14* (2013.01); *B32B 15/20* (2013.01); *C04B 20/1074* (2013.01); *B32B 2250/40* (2013.01); *B32B 2255/02* (2013.01); *B32B 2262/101* (2013.01); *B32B 2307/304* (2013.01); *B32B 2307/726* (2013.01); *B32B 2315/085* (2013.01); *B32B 2605/00* (2013.01);
(Continued)

(58) Field of Classification Search
CPC .... B32B 5/22; B32B 5/26; B32B 5/32; B32B 37/02; B32B 37/10; B32B 37/24; B32B 38/0004; B32B 2307/304; B32B 15/14; B32B 2315/085; B32B 2315/08; B32B 15/20; B32B 2250/40; B32B 2255/02; B32B 2307/276; B32B 2605/00; B23P 15/26; F28F 9/20; Y10T 56/1049; Y10T 29/4935; B33B 2262/101; C04B 20/1074
See application file for complete search history.

(56) References Cited

U.S. PATENT DOCUMENTS 5,830,548 A * 11/1998 Andersen .................. B28B 1/00
206/524.3
6,103,036 A * 8/2000 Gabriel .................. B29C 63/42
156/213
(Continued)

FOREIGN PATENT DOCUMENTS

| JP | 06-281089 | 10/1994 |
|---|---|---|
| JP | 07-139347 A | 5/1995 |

(Continued)

*Primary Examiner* — Tho V Duong
(74) *Attorney, Agent, or Firm* — Mintz Levin Cohn Ferris Glovsky and Popeo, P.C.

(57) ABSTRACT

A heat protector mounted on a vehicle is provided. The heat protected includes a glass fiber that has a plate shape and includes aerogel immersed therein. Thin films are respectively bonded to both surfaces of the glass fiber, and the thin films have a larger area than the glass fiber and extend from edges of the glass fiber. The extended parts of the thin films are overlapped and folded to form a winding portion that seals the glass fiber.

4 Claims, 5 Drawing Sheets

(52) U.S. Cl.
CPC ....... *B32B 2605/08* (2013.01); *Y10T 29/4935* (2015.01); *Y10T 156/1049* (2015.01)

(56) References Cited

U.S. PATENT DOCUMENTS

| | | | | |
|---|---|---|---|---|
| 6,403,180 | B1* | 6/2002 | Barrall | B32B 1/08 138/141 |
| 2007/0222116 | A1* | 9/2007 | Gould | B01J 13/0091 264/321 |
| 2008/0229704 | A1* | 9/2008 | Augustyniak | E04B 1/78 52/782.1 |
| 2009/0229032 | A1* | 9/2009 | Stepanian | B01J 13/0091 2/69 |
| 2011/0070789 | A1* | 3/2011 | Kalb, Sr. | B32B 5/26 442/1 |
| 2011/0252739 | A1* | 10/2011 | Leeser | B32B 3/266 52/741.3 |
| 2013/0221011 | A1* | 8/2013 | Yoon | B29C 53/06 220/592.1 |
| 2015/0241118 | A1* | 8/2015 | Wu | F25D 23/065 428/426 |

FOREIGN PATENT DOCUMENTS

| | | |
|---|---|---|
| JP | 2013-024341 A | 2/2013 |
| KR | 10-2006-0006020 | 1/2006 |
| KR | 2010-0075789 A | 7/2010 |
| WO | 94/02074 | 9/1994 |

\* cited by examiner

HEAT PROTECTOR AND MANUFACTURING AND MOUNTING METHODS

CROSS-REFERENCE TO RELATED APPLICATIONS

This application claims priority under 35 U.S.C. §119 to Korean Patent Application No. 10-2013-0101472, filed on Aug. 27, 2013, in the Korean Intellectual Property Office, the disclosure of which is incorporated herein by reference in its entirety.

BACKGROUND

1. Field of the Invention

The present invention relates to a heat protector for a vehicle which is mounted extraneous to an exhaust system to prevent transfer of exhaust heat of an exhaust gas to peripheral devices and occurrence of heat damage to the peripheral devices, and relates to manufacturing and mounting methods thereof.

2. Description of the Related Art

A heat protector is a part configured to protect vehicle electrical equipment and rubber parts from being damaged by heat generated from an engine. Generally, the heat protector is installed at each area of the engine which generates and transfers heat and an exhaust system that discharges an exhaust gas. Conventionally, as a heat protector for a vehicle, a plate of metal such as aluminum is processed to be fitted to a size and a shape of a site where the heat protector is mounted and then installed to cover the exterior of a heat source.

However, the conventional heat protector for a vehicle is entirely or partially made of a metal material, which increases the total weight of a vehicle. In other words, due to a high heat conductivity of the metal material, stacked heat protectors of multiple layers need to be installed at a local site where heat sources are concentrated.

SUMMARY

The present invention provides an insulating heat protector using silica aerogel having a nanoporous structure and manufacturing and mounting methods thereof and thus may be applied for weight reduction of a vehicle and applied to the fields related to insulation, thermal barrier, sound absorption, and the like. In addition, the present invention provides a heat protector further lightened using an aerogel material having an improved heat insulation property and provides a method for effectively manufacturing an insulating composition and a method for mounting the lightened heat protector.

An exemplary embodiment of the present invention provides a heat protector mounted on a vehicle (particularly, an exhaust system) that may include: a glass fiber having a plate shape and including aerogel immersed therein; and thin films respectively bonded to both surfaces of the glass fiber, and the thin films that have a larger area than the glass fiber and extend from edges of the glass fiber, and the extended parts of the thin films may overlap and fold to form a winding portion that seals the glass fiber. In an exemplary embodiment of the present invention, the glass fiber may be stacked in multiple layers and the thin films may be formed of aluminum to have a thickness of about 30 μm to 100 μm.

The heat protector configured as described above may be mounted on an exhaust pipe and/or a muffler of the vehicle. A method for mounting the heat protector on the exhaust pipe of the vehicle may include: a clamp mounting step where a ring-shaped clamp may be mounted on the exhaust pipe to mount the heat protector to cover a part of the exterior of the exhaust pipe and protrude from a surface of the exhaust pipe; and a fixing step where the heat protector may be mounted at the clamp to form a gap between the clamp and the exhaust pipe, and the heat protector may have a curved shape along a part of the exhaust pipe and may include a flange at an end in a longitudinal direction and may be installed to cover a part of the exhaust pipe, and when the flange is mounted on a protrusion portion formed outwardly from the clamp, a fixing bolt may bind the flange and the protrusion portion.

Further, a method for mounting the heat protector on the muffler may include: a fixing bracket mounting step where the heat protector may be mounted to cover the exterior of a cylindrical muffler and a fixing bracket may be bonded to the muffler; and coupling step where the heat protector may be inserted into the muffler, and the heat protector may be a size that creates a gap between the heat protector and the muffler and may have an opening part to which the muffler may be introduced, and when the muffler is mounted on the heat protector, a fixing bolt may be coupled to the fixing bracket extraneous to the heat protector to restrict movements of the heat protector.

An exemplary embodiment of the present invention provides a method for manufacturing a heat protector and may include: cutting a glass fiber is cut into a plate-shaped piece having a substantially uniform size; mixing a highly heat-resistant binder mainly made of a mixture of silicate and silicon with waterborne aerogel to manufacture an aerogel compound; coating the aerogel on both surfaces of the glass fiber; drying the glass fiber coated with the aerogel; respectively stacking thin films having a larger area than the glass fiber on an upper surface and a lower surface of the glass fiber coated with the aerogel; pressurizing the glass fiber and the thin films to adhere to each other; and forming a winding portion by folding parts of the thin films protruded from the glass fiber. Further, the method may include stacking the aerogel (e.g., aerogel compound) that contains waterborne aerogel, and multiple glass fibers coated with the aerogel.

The heat protector configured as described above may be further lightened (e.g., the weight of the protector may be reduced) as compared with a conventional metal heat protector, and since a glass fiber layer may include thin films bonded to both surfaces of the protector and a winding portion is bonded along the edge of the protector, it may be possible to prevent damage to the glass fiber layer and separation thereof. Further, the above-described heat protector may be mounted to form a gap between the heat protector and the exhaust pipe and/or the muffler, and, thus, an air layer present between the heat protector and a heating element may have an insulation effect and total heat may be reduced by a vehicle-induced wind during driving.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a heat protector and manufacturing and mounting methods of the heat protector according to exemplary embodiments of the present invention will be explained in detail with reference to the accompanying drawings.

Figure 1:
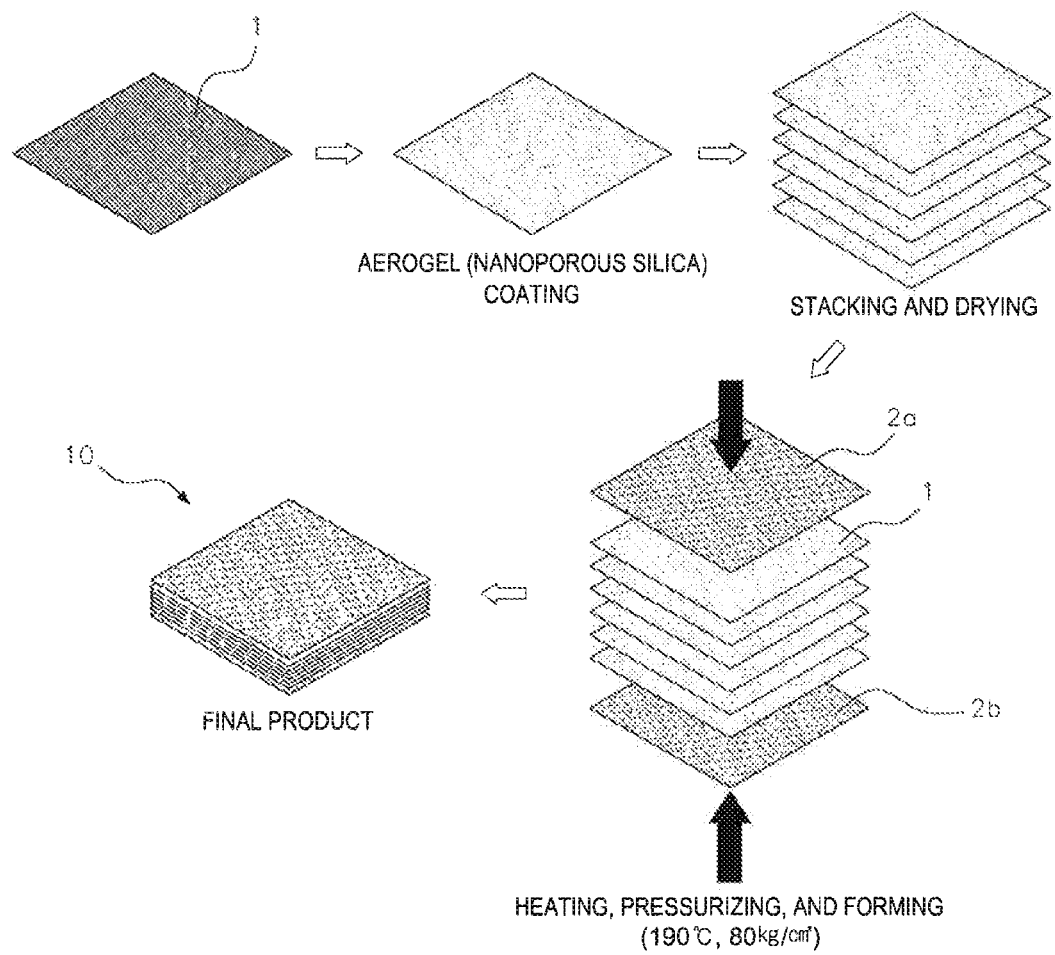
FIG. 1 is an exemplary diagram illustrating steps for manufacturing a heat protector according to an exemplary embodiment of the present invention.

Referring to FIG. 1, a heat protector 10 of the present invention may be manufactured by coating a liquid aerogel (i.e. nanoporous silica) containing silicon dioxide and having a nanoscale bonding structure on both surfaces of a glass fiber 1 cut into a plate-shaped piece having a substantially uniform size and thickness, and bonding thin films 2 (2a and 2b) (e.g., formed of aluminum having a thickness of, for example, about 30 to 100 μm) to the both surfaces of the glass fiber 1.

The aerogel of the present invention may be prepared by manufacturing a gel-state aqueous solution by mixing water with an SAP (Super Absorbent Polymer), adding hydrophobic aerogel powder to the aqueous solution by stirring to obtain waterborne aerogel, and then additionally mixing a binder with the waterborne aerogel. Thus, particles of the aerogel of the present invention may be coated with a water-soluble material and the binder may not permeate into micro pores formed at the hydrophobic aerogel.

In an exemplary embodiment of the present invention, a weight ratio of the super absorbent polymer (SAP) to the water may be in a range of about 1:50 to 1:1000. When the super absorbent polymer contains less than the above-described adequate range, the amount of the water may be excessive (e.g., beyond a predetermined threshold) and an insulating composition may not have an adequate viscosity. When the super absorbent polymer contains more than the above-described adequate range, the amount of the super absorbent polymer may be excessive (e.g., beyond a predetermined threshold) and the insulating composition may have an increased viscosity and thus may be difficult to be mixed with hydrophobic aerogel powder. Further, a weight ratio of the super absorbent polymer to the water may be in a range of about 1:100 to 1:500.

Figure 2:
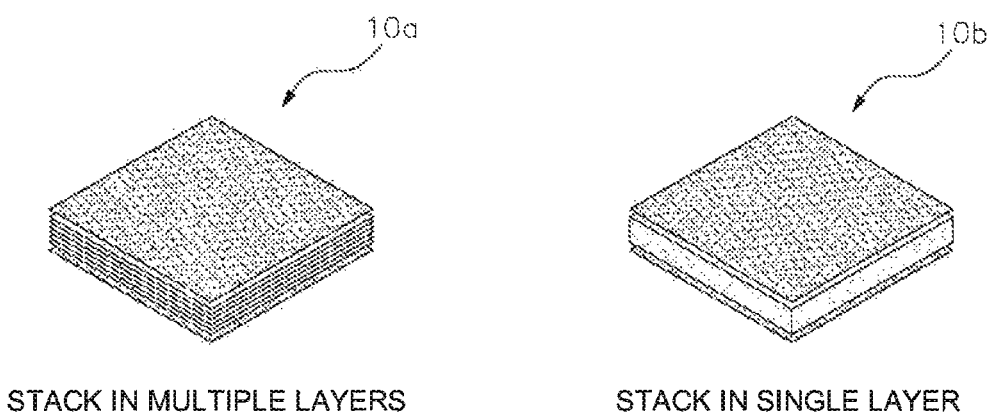
FIG. 2 is an exemplary diagram illustrating a heat protector formed of multiple layers of glass fiber and a heat protector formed of a single layer of glass fiber.

The surfaces of the glass fiber 1 may be coated with the aerogel, and the aerogel may contain a highly heat-resistant binder mainly made of a mixture of silicate and silicon. Thus, as illustrated in FIG. 2, after the glass fiber 1 is stacked in multiple layers, the thin films 2 may be bonded thereto, or the thin films 2 may be bonded to the single glass fiber 1 having a predetermined thickness. The highly heat-resistant binder may be prepared by mixing silicate and a silicon resin as main components, and the silicate to be mixed herein may include at least one selected from the group consisting of water glass and colloidal silica.

Moreover, in an exemplary embodiment of the present invention, the silicon resin may contain a silicon resin expressed by Chemical Formula 1 as a main component and may also contain an organic diluent.

Chemical Formula I

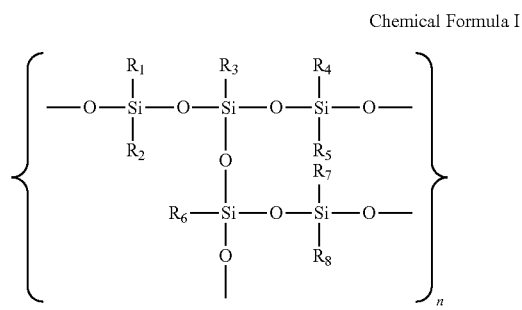

In Chemical Formula 1, $R_1$ to $R_8$ are respectively and independently selected from the group consisting of hydrogen, $C_{1-8}$ alkyl, aryl, and $C_{3-8}$ cycloalkyl, and n is an integer of 1 to 100,000. In particular, the $R_1$ to $R_8$ may be independently selected from the group consisting of methyl, ethyl, and phenyl. Further, the organic diluent may be an aromatic hydrocarbon, alcohol, or water. In particular, the aromatic hydrocarbon may include at least one selected from the group consisting of xylene, ethylbenzene, and water.

Furthermore, the highly heat-resistant binder containing the mixture of silicate and silicon as a main component may be contained in an amount of about 50 to 150 parts by weight with respect to about 100 parts by weight of the total weight of the water, the super absorbent polymer (SAP), and the hydrophobic aerogel powder. In addition, the highly heat-resistance binder may be contained in about the same weight as the total weight of the water, the super absorbent polymer, and the hydrophobic aerogel powder, i.e. at a weight ratio of about 1:1. When the highly heat-resistant binder is contained in an amount of less than about 50 parts by weight with respect to about 100 parts by weight of the total weight of the water, the super absorbent polymer, and the hydrophobic aerogel powder, an absolute amount of the binder used as an adhesive component may be insufficient and thus, an adequate adhesive force may not be obtained. When the highly heat-resistant binder is contained in an amount of more than about 150 parts by weight, the binder may be consumed more than necessary (e.g., over consumed), and, thus, may not be desirable.

A method for manufacturing the heat protector of the present invention may include coating both surfaces of the glass fiber 1 with the aerogel, and respectively stacking the thin films 2 on the both surfaces of the glass fiber 1 coated with the aerogel. In addition, the method may include pressurizing the glass fiber 1 and the thin films 2 at a predetermined temperature about 190° C.) and at a predetermined pressure (e.g., about 80 kg/cm$^2$) to adhere to each other and to be formed in a predetermined shape (e.g., within a mold). Further, as described above, the method may include stacking the multiple glass fibers 1 coated with the aerogel.

Particularly, in the manufacturing method of the present invention, the heat protector 10 may have a structure in which the glass fiber 1 is stacked in multiple layers or a structure in which the glass fiber 1 is stacked in a single layer based on a required characteristic of the heat protector 10. For example, for the structure in which the glass fiber 1 is stacked in multiple layers, since the respective glass fibers 1 may be coated with the aerogel and then stacked, the aerogel may be coated substantially uniformly between the glass fiber layers, thus improving a heat insulation property. However, as the number of stackings and a drying time increase, a manufacturing time also increases and additional manufacturing processes are required. Further, for the structure in which the glass fiber 1 is stacked in a single layer, permeating the aerogel into the glass fiber 1 may be more difficult, and, thus, distribution uniformity of the aerogel may be lower than the multilayered structure but the stacking process may be omitted and the number of manufacturing processes may be reduced.

Figure 3:
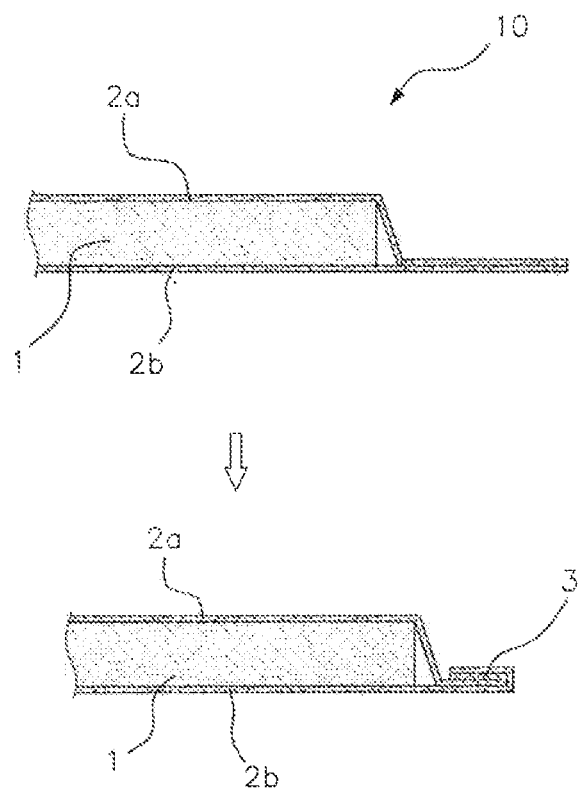
FIG. 3 is an exemplary diagram illustrating a process of forming a winding portion by folding thin films along an edge of a glass fiber according to an exemplary embodiment of the present invention.

Meanwhile, the manufacturing method of the present invention may include forming a winding portion 3 by folding parts of the thin films 2 protruding from the glass fiber 1. In other words, the thin films 2a and 2b may be cut to have a larger area than the glass fiber 1 and bonded to the glass fiber 1, and, thus, the thin films 2a and 2b may have parts that protrude from the glass fiber 1. Therefore, as illustrated in FIG. 3, the winding portion 3 may be formed by pressing a part of the thin film 2 that protrudes from the glass fiber 1 from both above and below to be in a surface contact state and folding or rolling the part toward the glass fiber 1.

The heat protector 10 of the present invention manufactured by the above-described method may include the glass fiber 1 a glass fiber having a plate shape and including aerogel immersed therein; and thin films 2 respectively bonded to the both surfaces of the glass fiber 1, and the thin films extend from edges of the glass fiber 1 and parts of the thin films 2 may be overlapped and folded to form the winding portion 3. Herein, the glass fiber 1 may be stacked in multiple layers or in a single layer.

Figure 4:
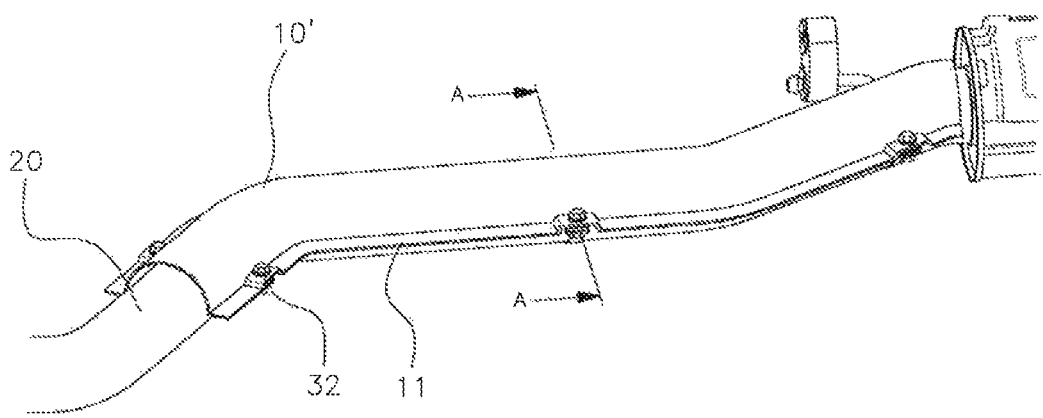
FIG. 4 is an exemplary diagram illustrating a heat protector mounted on an exhaust pipe according to an exemplary embodiment of the present invention.
Figure 5:
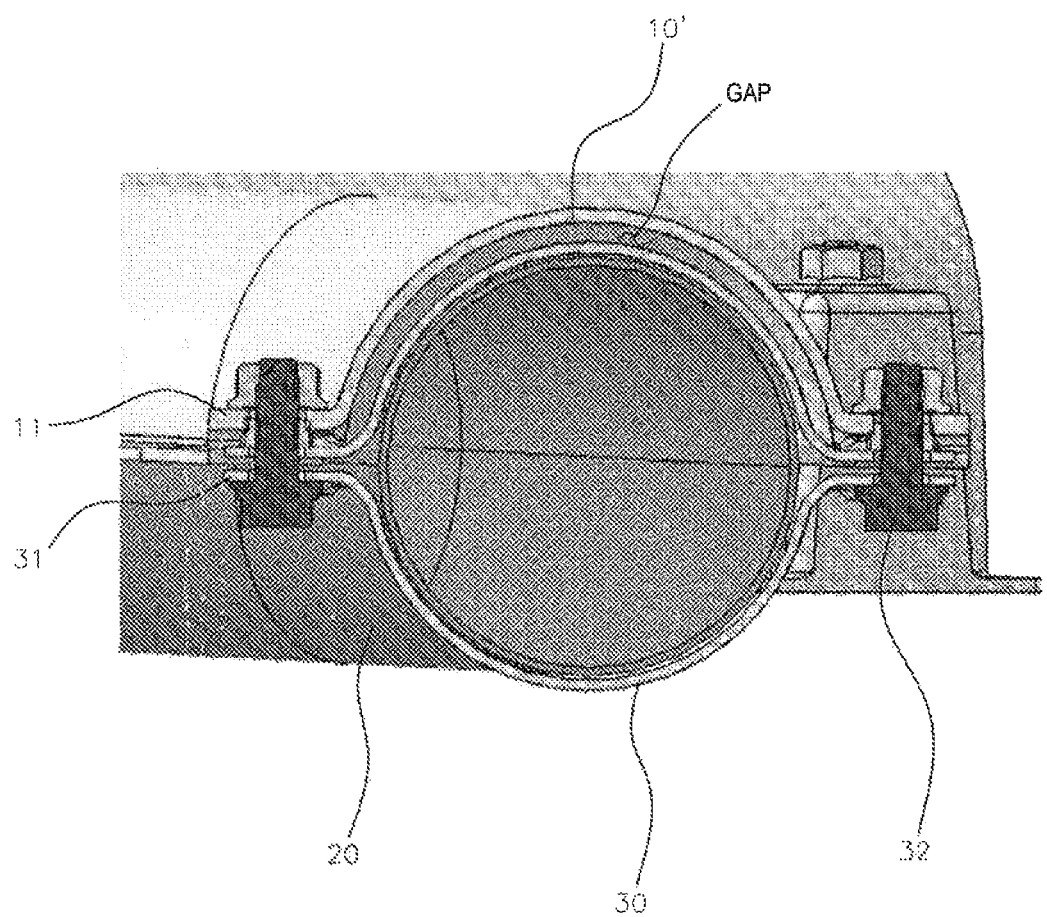
FIG. 5 is an exemplary cross-sectional view taken along a line A-A in FIG. 4 according to an exemplary embodiment of the present invention.

The heat protector 10' of the present invention may be mounted on an exhaust pipe and/or a muffler that radiates exhaust heat of an exhaust gas. As illustrated in FIG. 4, a method for mounting a heat protector 10' of the present invention on an exhaust pipe 20 may include: clamp mounting the heat protector 10' (e.g., manufactured to have a larger area in the same shape as the exhaust pipe) to cover the exterior of the exhaust pipe 20, and before the heat protector 10' is mounted, a ring-shaped clamp 30 may be mounted on the exhaust pipe 20 to cause the heat protector 10' to protrude from a surface of the exhaust pipe 20; and mounting the heat protector 10' at the clamp 30 to form a gap between the clamp 30 and the exhaust pipe 10'. The heat protector 10' may have a curved shape along a part of the exhaust pipe 10' and may include a flange 11 at both ends of the heat protector 10' in a longitudinal direction and may be installed to cover a part of the exhaust pipe 20. Further, when the flange 11 is mounted on a protrusion portion 31 formed outwardly from the clamp 30, a fixing bolt 31 may bind the flange 11 and the protrusion portion 31.

Figure 6A:
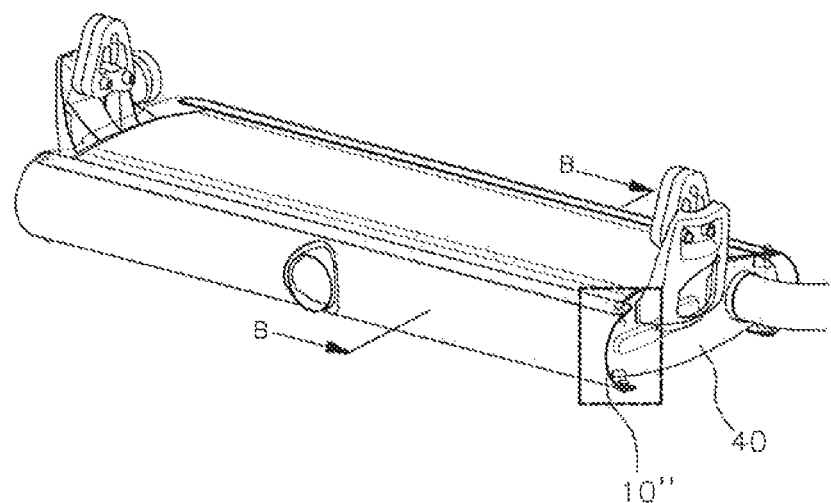
FIGS. 6A-6C are exemplary diagrams illustrating a heat protector mounted on a muffler according to an exemplary embodiment of the present invention.
Figure 6B:
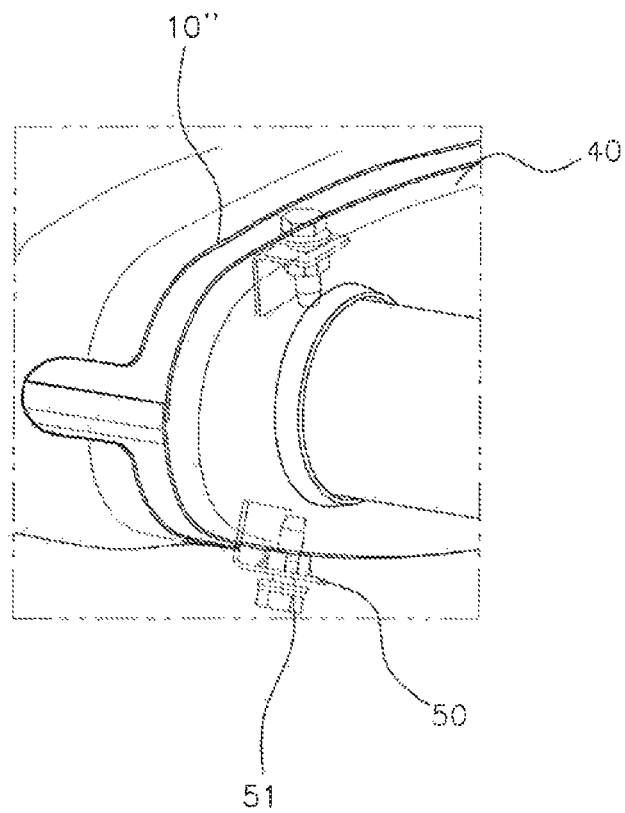
Figure 6C:
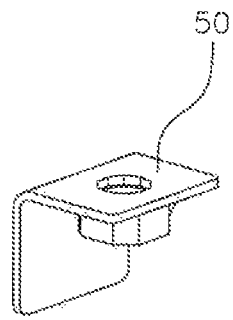
Figure 7:
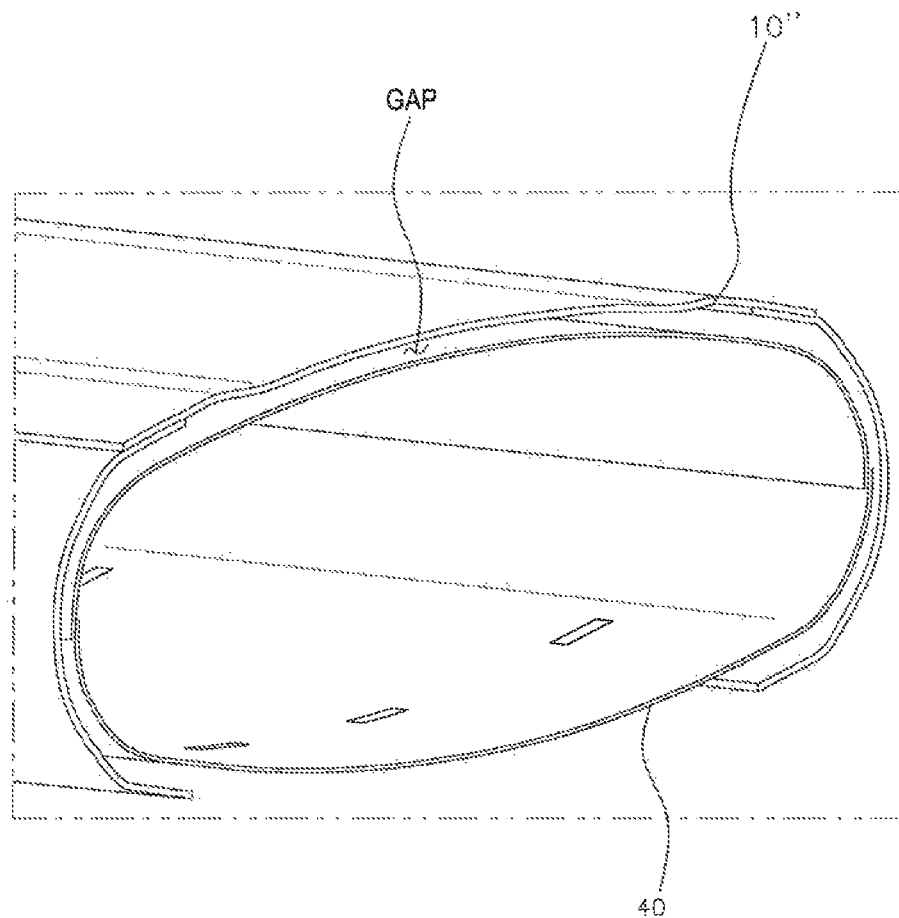
FIG. 7 is an exemplary cross-sectional view taken along a line B-B in FIG. 6A according to an exemplary embodiment of the present invention.

Additionally, as illustrated in FIGS. 6A-6C, the present invention further provides a method for mounting a heat protector 10" on a muffler 40. The method for mounting the heat protector 10" manufactured to cover the exterior of the cylindrical muffler 40 may include: mounting the heat protector 10" using a fixing bracket 50, the fixing bracket 50 may be bonded to the muffler 40 at a position which does not obstruct introduction of the heat protector 10" and fixing the heat protector 10" by sliding the heat protector 10" (e.g., inserting) into the muffler 40. The heat protector 10" may be inserted into the muffler 40 as described above and may have a gap with respect to the muffler 40 and may have an opening part, to which the muffler 40 may be introduced, on one or both sides. Further, when the muffler 40 is mounted on the heat protector 10", a fixing bolt 51 may be coupled to the fixing bracket 50 extraneous to the heat protector 10" to restrict movements of the heat protector 10".

The heat protector of the present invention configured as descried above may be manufactured using aerogel (e.g., nanoporous silica) as a material having a substantially low density (e.g., about 3 to 5% with respect to a conventional heat protector made of aluminum) and an improved heat insulation property. Therefore, as compared with a conventional heat protector, the heat protector may be lightened.

Further, the present invention provides a composition for a heat protector improved in an insulation property and lightened. Since the composition may be mixed stably and substantially uniformly while a characteristic of a hydrophobic aerogel powder is maintained, availability is increased. In other words, when aerogel is mixed with a typical binder, the binder permeates into pores of the aerogel, resulting in a sharp deterioration of a property, particularly an insulation property, of the aerogel. However, according to an exemplary embodiment of the present invention, when waterborne aerogel is prepared first and mixed with a highly heat-resistant binder, water forms a wafer film on a surface of hydrogel aerogel powder, and, thus, it may be possible to suppress hardening caused by permeation of a component of the binder into the aerogel. Then, the component of the binder may be hardened in a drying step and the water may evaporate. Therefore, numerous Nano pores of the aerogel may remain and permeation of the binder into the pores of the aerogel may be prevented. Accordingly, a composition for a heat protector of a vehicle may improve insulation and weight lightening properties of the heat protector.

Additionally, the method for mounting the heat protector of the present invention may be selectively performed after the exhaust pipe and/or the muffler are completely mounted. Therefore, it may be possible to simplify an assembly process as compared with a conventional method where a heat protector is mounted integrally with an exhaust pipe and/or a muffler. Since heat may be blocked in close proximity to heat sources (e.g., exhaust pipe and muffler); a thermal barrier structure conventionally used for each part may be omitted. Thus, a gap between an exhaust pipe and bodywork may be reduced and an interior package space may be increased.

As described above, the exemplary embodiments disclosed in the present specification and drawings are provided only for understanding of the present invention but do not limit the scope of the present invention. It will be apparent to an ordinary person skilled in the art that various modifications and variations of the described exemplary embodiments can be made based on the spirit and scope of the invention.

What is claimed is:

1. A method for manufacturing a heat protector comprising:
   cutting a glass fiber into a plate-shaped piece having a substantially uniform size;
   coating aerogel on both surfaces of the glass fiber;
   drying the glass fiber coated with the aerogel;
   respectively stacking thin films having a larger area than the glass fiber on an upper surface and a lower surface of the glass fiber coated with the aerogel;
   pressurizing the glass fiber and the thin films to adhere to each other; and
   forming a winding portion by folding a plurality of parts of the thin films that protrude from the glass fiber.

2. The method for manufacturing a heat protector of claim 1, wherein the aerogel is prepared by mixing a highly heat-resistant binder containing a mixture of silicate and silicon with waterborne aerogel.

3. The method for manufacturing a heat protector of claim 2, wherein the waterborne aerogel is prepared by adding hydrophobic aerogel powder into an aqueous solution in which a super absorbent polymer (SAP) is mixed with water by stirring.

4. The method for manufacturing a heat protector of claim 3, further comprising:
   stacking the glass fiber coated with the aerogel that contains the highly heat-resistant binder in multiple layers.

* * * * *